United States Patent
Evans

[15] 3,695,290
[45] Oct. 3, 1972

[54] NOISE SUPPRESSING DEVICE FOR FLUID FLOW LINES

[72] Inventor: Kenneth R. Evans, 7015 Neff St., Houston, Tex. 77036

[22] Filed: July 22, 1970

[21] Appl. No.: 57,233

[52] U.S. Cl. ............... 137/563, 137/13, 251/123, 138/39, 138/114
[51] Int. Cl. ............................................. F16k 47/08
[58] Field of Search ..... 137/1, 13, 81.5, 563; 138/39, 138/44, 114; 251/123, 124, 118, 127; 181/44, 45, 46, 56; 73/211, 212, 213

[56] References Cited

UNITED STATES PATENTS

| | | | |
|---|---|---|---|
| 1,896,833 | 2/1933 | Bramsen et al. | 251/127 X |
| 3,026,727 | 3/1962 | Spurling | 73/211 |
| 3,600,945 | 8/1971 | Wenzel et al. | 73/211 |
| 3,187,763 | 6/1965 | Adams | 137/81.5 |
| 3,206,928 | 9/1965 | Moore | 137/81.5 X |
| 3,247,667 | 4/1966 | Adams et al. | 137/81.5 X |
| 2,037,940 | 4/1936 | Stalker | 138/39 |
| 2,948,148 | 8/1960 | De Jurquet et al. | 137/81.5 X |
| 3,111,091 | 11/1963 | Hopkinson | 138/44 X |
| 3,146,798 | 9/1964 | Chenault | 138/44 |
| 3,250,342 | 5/1966 | Petry | 251/124 X |

*Primary Examiner*—William B. Cline
*Attorney*—Charles E. Lightfoot

[57] ABSTRACT

A noise suppressing device for use in flow lines in which a zone of reduced pressure is produced downstream of a restriction in the flowway, such as may be caused by the use of a flow regulating device such as a valve or orifice device in the line, and comprising means forming a passageway for the flow of fluid into said zone from a location of higher pressure. The location from which fluid flows into the reduced pressure zone may be either upstream or downstream from the zone in the flow line or from a source outside of the flow line, and means may be provided for regulating such flow. The method of the invention comprises the decreasing of noise in a flow line caused by the formation of a zone of reduced pressure therein through which fluid under pressure flows through the line, by introducing fluid into said zone at a higher pressure than the pressure in the zone.

2 Claims, 4 Drawing Figures

Kenneth R. Evans
INVENTOR

BY
Charles E. Lightfoot
ATTORNEY

Kenneth R. Evans
INVENTOR

BY
Charles E. Lightfoot
ATTORNEY

NOISE SUPPRESSING DEVICE FOR FLUID FLOW LINES

BACKGROUND OF THE INVENTION

In the operation of fluid flow lines, such as gas pipelines, such lines are commonly provided with valves, orifice devices such as orifice plates and the like, by which the flow in the line is restricted more or less for purposes of controlling or measuring the flow of fluid. The presence of such devices in flow lines and more particularly in lines which are operated at high pressures, frequently causes noise eminating from locations where the flow is restricted and at times the noise generated may be of such volume as to make working in the vicinity uncomfortable, or even impossible.

The noise produced in such pipe lines is the result of a zone of reduced pressure immediately downstream from the location of the restriction in the line which causes a violent turbulence as the fluid flows at high velocity past this zone, the phenomenon being well known to persons having ordinary skill in the construction and maintenance of pressure fluid lines.

Heretofore, various means have been proposed for eliminating noises produced in this manner, such as by shaping the line to eliminate the zone of reduced pressure, or by inserting in the line at such zone a device to close off or fill the zone to prevent the turbulence caused by the reduced pressure therein. Noise reducing devices of this kind have not proven generally satisfactory, however, due to their high cost, their lack of adjustability to compensate for changes in the amount of restriction of the flow, such as that which occurs where a valve is placed in the line, or which may result from wear in or changing of the size of the orifice in an orifice plate.

In the case of an insert of predetermined shape which is placed in the line at a location to fill the zone of reduced pressure therein, a change in the amount of restriction in the line, such as by variation of the opening of a valve or a change in the size of an orifice due to wear may so alter the shape and size of the zone as to render the noise suppressor ineffective.

SUMMARY OF THE INVENTION

Briefly described, the noise suppressing device of the invention comprises means such as one or more branch pipes or return pipes or a flow chamber formed by inner and outer, radially spaced, tubular walls, providing passageway which is in communication with the reduced pressure zone in a flow line having a restriction therein producing a zone reduced pressure downstream of such restriction, and which is also in communication with the interior of the flow line at a location of higher pressure than that in said zone, to allow the flow of fluid from the flowway into the zone to cause an increase in the pressure therein.

The restriction in the flow line may be the result of the use of a valve in the line, or a restricting device such as an orifice or other device by which a zone of reduced pressure is produced downstream of such restriction and which causes turbulence in the flowing fluid resulting in noise.

Means may be provided, such as valves for controlling the flow of fluid through the passageway from the flow line to the reduced pressure zone.

The method of the invention comprises reducing the noise produced in a flow line due to the formation therein of a zone of zone of reduced pressure through which fluid under pressure flows through the line, by introducing into the zone fluid under pressure from a source at a pressure above the pressure in the zone.

DETAILED DESCRIPTION OF A PARTICULAR EMBODIMENT OF THE INVENTION

Figure 1:
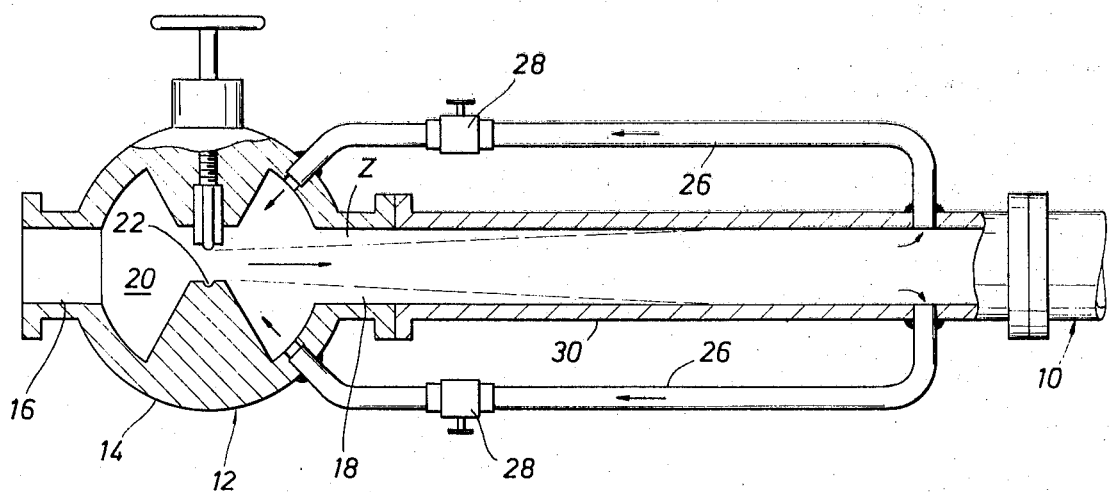
FIG. 1 is a side elevational view, partly broken away, and partly in cross section, illustrating a preferred embodiment of the noise suppressor of the invention.

As illustrated in FIG. 1 the invention may be applied to a pipe line, generally designated 10 into which a valve, generally designated 12, is connected to control the flow of fluid in the line in a usual manner. The valve 12 may conveniently be of a type having a casing 14 provided with an inlet 16 and an outlet 18 and a flowway 20 between the inlet and outlet, and formed with a valve seat 22 in the flowway positioned for coaction with a movable valve member 24 of a usual type to control the flow of fluid through the valve.

It will be apparent that in the use of a valve of this kind in a flow line a zone of reduced pressure, such as that shown in dashed lines and designated Z, will be formed downstream from the valve seat 22, which zone is of generally annular shape in cross-section and diminishes in cross-sectional area downstream. The extent of this zone will depend upon the pressure of the fluid in the line and the extent to which the valve 24 is opened. The noise produced in a flow line equipped in this manner is caused by the turbulence resulting from the flow of fluid at a higher pressure past the zone of reduced pressure.

For the purpose of eliminating or substantially reducing such noise, the flow line is provided with means, such as one or more return or branch pipes 26, forming a passageway through which fluid under pressure may flow from a location in the flowway outside of said zone of reduced pressure may flow into said zone at a location to reduce or eliminate the turbulence in the line which causes the noise.

The return or branch pipes 26, in the present illustration are connected at their downstream ends into the line at a location beyond the downstream end of the zone of reduced pressure and open at their upstream ends into the valve casing 14, through suitable openings 15 therein, at a location at or near the upstream end of the reduced pressure zone.

The return pipes 26 may be provided with suitable means, such as the valves 28 of usual construction for regulating the backflow of fluid from the flow line into the reduced pressure zone.

In the operation of the pipe line fluid from the flow way at a location of higher pressure may flow into the zone of reduced pressure at a location to cause an increase in pressure in said zone to reduce or substantially eliminate the noise producing turbulence resulting from the flow of fluid in the flow way past said zone.

It will be apparent that a change in the shape or extent of the zone of reduced pressure, or a change in the amount of the reduction of pressure therein, such as might be caused by varying the opening of the valve 12, will be automatically compensated for by an increase or decrease in the back flow of fluid through the pipes 26.

Figure 2:
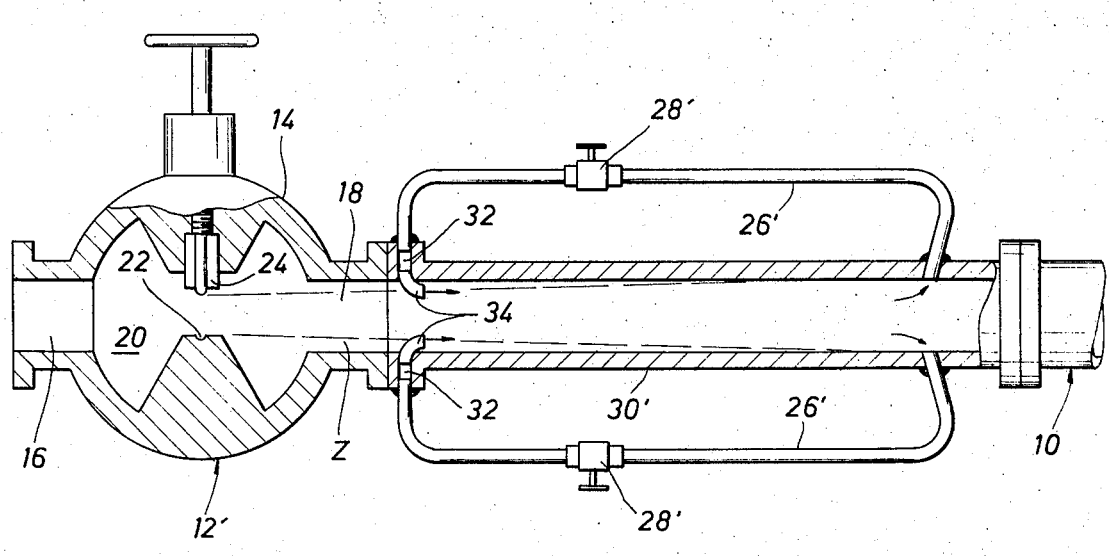
FIG. 2 is a view similar to that of FIG. 1, illustrating a modified form of the invention.

A somewhat different form of the invention is illustrated in FIG. 2, wherein the noise suppressing device takes the form of a unitary assembly comprising a section of pipe 30 adapted to be connected at its inlet end to the outlet of the valve 12' and at its outlet end to a downstream section of the pipe line. Return or branch pipes 26', similar to the pipe 26 are connected into the pipe section 30' at locations to allow the flow of fluid from the flow line at a downstream location of higher pressure into the zone of reduced pressure at an upstream location therein. The pipes 26' may be provided with valves 28' similar to the valves 28 and for the same purpose.

The pipe section 30' may be formed with openings 32 near its inlet end into which the outlet ends of the pipes 26' are connected and from which discharge outlet fittings or nozzles 34 are extended into the flow line. The fittings or nozzles 34 may be curved to discharge fluid into the reduced pressure zone in a downstream direction.

In installing the device in a flow line the pipe section 30' may be connected in a usual manner at its inlet end to the outlet of a valve 12' which may be of any desired type, the outlet end of the pipe section being connected to a downstream section of the line.

This modified form of the invention is operated in the same manner as is the form illustrated in FIG. 1, but possesses the advantage that it may be installed in a flow line as a unit in conjunction with various types of valves or flow restricting devices.

Figure 3:
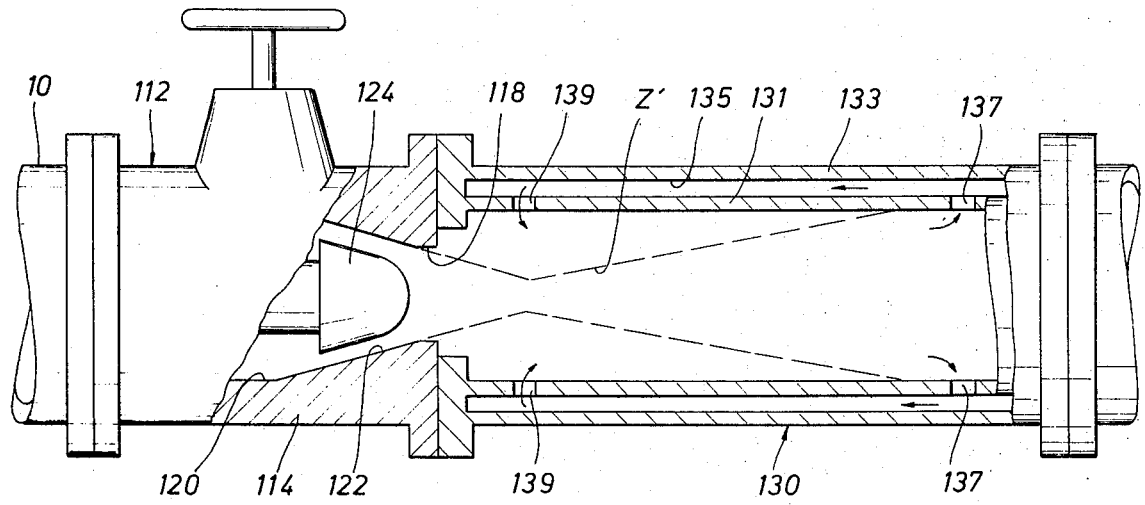
FIG. 3 is a view similar to that of FIG. 1, illustrating a further modified form of the invention; and, FIG. 4 is a view similar to that of FIG. 1, illustrating a still further modification of the invention.

A further modification of the invention is illustrated in FIG. 3, wherein the flow line is provided with a valve or other flow regulating device 112, such as a variable orifice. In this case, the flow regulating device may have a casing 114 having an outlet 118 through which fluid from the flow way 120 is discharged, through an orifice or seat 122 in which a flow regulating member or valve 124 is movable to regulate the amount of flow through the device.

It will be evident that the flow of fluid through the device may be regulated by varying the position of the member 124 relative to the orifice 122 and that the zone Z' of reduced pressure downstream of the device will be varied accordingly.

In this form of the invention the noise suppressing means takes the form of a tubular pipe section, generally designated 130 formed with inner and outer, radially spaced, cylindrical walls 131 and 133 providing an annular chamber 135 which is in communication with the flow line at a location downstream of the reduced pressure zone Z' through suitable openings 137 in the inner wall 131 and at a location in the reduced pressure zone longitudinally upstream from the openings 137 through openings 139 in the inner wall 131. The chamber 135 thus forms a passageway of increased cross-sectional area, located exteriorly of the path of flow of fluid through the flow line through which fluid may flow from a location of higher pressure in the flow line to the zone of reduced pressure to allow an increase in the pressure in said zone by which the noise is reduced.

It will be seen that the pipe section 130 is a unitary structure which may be readily inserted in a pipe line at a location downstream of a valve or flow regulating device without the necessity of changing the structure or arrangement of the regulating device, thus enabling the noise suppressor to be used with various kinds of low regulating devices.

The operation of this form of the invention is similar to that previously described in connection with the devices illustrated in FIGS. 1 and 2.

The noise suppressing device of the invention may also be of a type in which fluid is taken from the flow line upstream of the zone of reduced pressure and introduced into that zone at a location to reduce or eliminate the noise produced by the flow of fluid therethrough. For this purpose a further modified form of the invention may be used, such as that illustrated in FIG. 4.

Figure 4:
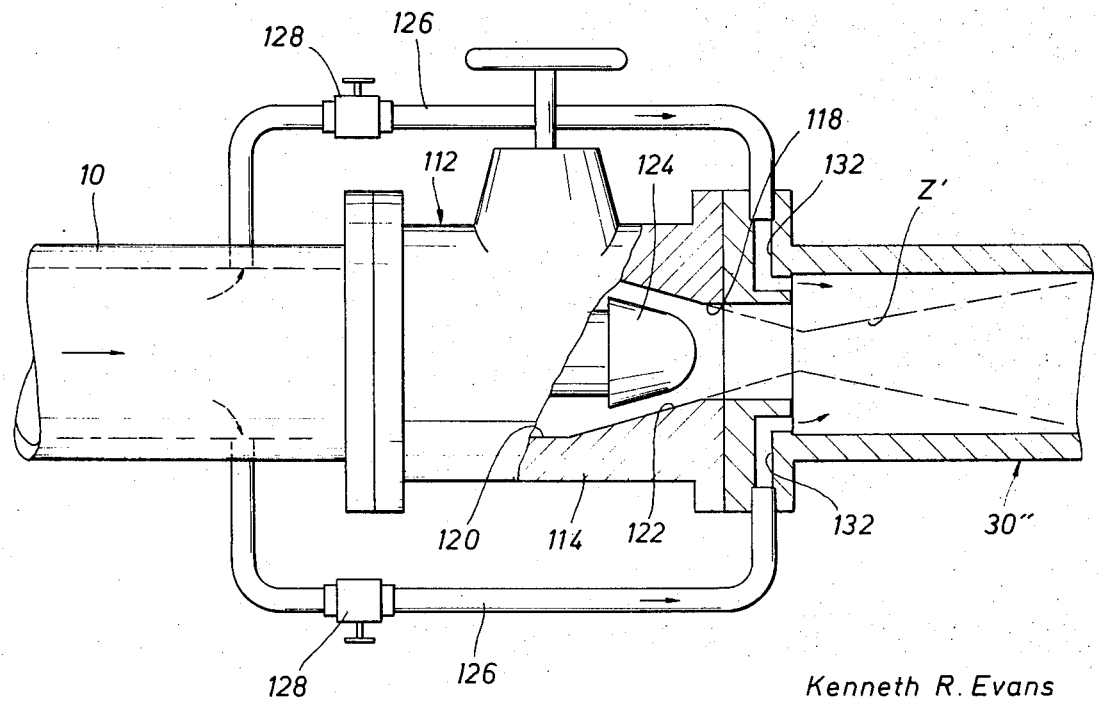

In the device of FIG. 4, the noise suppressor takes the form of a pipe section 30" adapted to be connected at its upstream end to the outlet of a flow regulating device, such as that indicated at 112 and having inlet openings 132 at or near its upstream end. Branch pipes 126 are connected at their downstream ends into the inlet openings 132 and are connected at their upstream ends into the flow line at a location upstream of the reduced pressure zone, such as at a location upstream of the flow regulating device 112. The branch pipes may be provided with valves 128 or other means for regulating the flow of fluid therethrough.

In this form of the invention, fluid under pressure is furnished to the reduced pressure zone from a location of higher pressure in the line upstream of the zone.

The invention thus provides a noise suppressing device in which fluid is caused to flow from a flowway at a location of higher pressure into a zone of reduced pressure to reduce turbulence and noise resulting from the flow of fluid in the line through said zone.

The method of the invention may be employed in a flow line in which some restriction of the flow takes place to cause the formation of a zone of reduced pressure downstream of the restriction through which zone fluid under pressure flows in the line to produce a noise, which method comprises introduction into said zone from some location in a line outside the zone, or from some source outside of the line, fluid at a pressure higher than the pressure in the zone to reduce the difference between the pressure of the flowing fluid and the pressure in the zone, thereby reducing the noise.

Having thus clearly shown and described the invention, what is claimed as new and desired to secure by Letters Patent is:

1. a noise suppressor device adapted to be used downstream from a restriction in a flow line where the restriction creates noise by forming a lower pressure zone downstream of the restriction, comprising:

a flanged pipe adapted to be connected downstream of a noise creating restriction, said flange extending inwardly to define a downstream facing shoulder;

a by-pass line adapted to be connected to such flow line at a point of higher pressure; and, passage means in said flanged pipe extending from the exterior to the interior at a point near one end thereof and passing through the flange on said flanged pipe and opening downstream, said passage means being adapted to be connected with said by-pass line.

2. The structure of claim 1 including a valve in said by-pass line.

* * * * *